US008830296B1

(12) United States Patent
Vivekanandan et al.

(10) Patent No.: US 8,830,296 B1
(45) Date of Patent: Sep. 9, 2014

(54) ENDPOINT DEVICE-SPECIFIC STREAM CONTROL FOR MULTIMEDIA CONFERENCING

(75) Inventors: Janahan Vivekanandan, Los Altos, CA (US); Ujjwal Singh, Palo Alto, CA (US); Param Reddappagari, Redmond, WA (US); Zhengping Zuo, Sammamish, WA (US)

(73) Assignee: Google Inc., Mountain View, CA (US)

( * ) Notice: Subject to any disclaimer, the term of this patent is extended or adjusted under 35 U.S.C. 154(b) by 214 days.

(21) Appl. No.: 13/533,889

(22) Filed: Jun. 26, 2012

(51) Int. Cl.
*H04N 7/14* (2006.01)

(52) U.S. Cl.
USPC .................. 348/14.09; 370/260; 709/204

(58) Field of Classification Search
CPC .................................................. H04L 12/1813
USPC .................. 379/204.01; 348/14.09; 370/260; 709/204
See application file for complete search history.

(56) References Cited

U.S. PATENT DOCUMENTS

| 6,564,380 | B1 | 5/2003 | Murphy |
| 6,831,675 | B2 | 12/2004 | Shachar et al. |
| 6,976,055 | B1 | 12/2005 | Shaffer et al. |
| 7,627,629 | B1 * | 12/2009 | Wu et al. ...................... 709/204 |
| 8,212,856 | B2 * | 7/2012 | Modai et al. ............... 348/14.12 |
| 2002/0027597 | A1 | 3/2002 | Sachau |
| 2002/0103864 | A1 | 8/2002 | Rodman et al. |
| 2006/0092269 | A1 | 5/2006 | Baird et al. |
| 2008/0273079 | A1 | 11/2008 | Campbell et al. |
| 2009/0284579 | A1 | 11/2009 | Knaz |
| 2010/0149302 | A1 | 6/2010 | Malik |
| 2011/0066924 | A1 | 3/2011 | Dorso et al. |
| 2011/0161836 | A1 * | 6/2011 | Mu et al. ...................... 715/756 |
| 2011/0249073 | A1 | 10/2011 | Cranfill et al. |
| 2011/0249079 | A1 | 10/2011 | Santamaria et al. |
| 2011/0270933 | A1 | 11/2011 | Jones et al. |
| 2013/0063542 | A1 * | 3/2013 | Bhat et al. ................. 348/14.03 |

OTHER PUBLICATIONS

Lemon, Sumner, "Skype CEO Envisions Switching Devices During Calls", PCWorld, Jun. 15, 2010, retrieved from <http://www.pcworld.com/printable/article/id,198847/printable.html>, 1 pg.
"The Avaya Desktop Video Device with the Avaya Flare Experience", Avaya Fact Sheet, Sep. 2010, 4 pgs., Avaya, Inc.
"VidyoConferencing Administrator's Guide", Vidyo—Personal Telepresence, 2011, 249 pgs., System Version 2.1—Document Version 2.1-D, Vidyo, Inc.

(Continued)

*Primary Examiner* — Creighton Smith
(74) *Attorney, Agent, or Firm* — McDermott Will & Emery LLP

(57) ABSTRACT

A system for endpoint device-specific stream control for multimedia conferencing may include one or more processors and memory. The one or more processors may perform steps of providing a hosted multimedia conference to participant devices, determining whether each participant device is capable of providing a video stream transmission and providing, to each participant device, video stream controls that provide for controlling video streams of exclusively the other participant devices that are determined to be capable of providing video stream transmissions. The steps may further include receiving a selection of a first video stream control corresponding to a first participant device from second and third participant devices, receiving a video stream from the first participant device, and providing the video stream to the second and third participant devices based at least in part on the received selections of the first video stream control by the second and third participant devices.

19 Claims, 7 Drawing Sheets

(56) References Cited

OTHER PUBLICATIONS

"HDFaces Video Conferencing", GoToMeeting—Global Customer Support, retrieved from <http://support.citrixonline.com/GoToMeeting/all_files/GTM150001> on Mar. 30, 2012, pp. 1-4, Citrix Online, LLC.

Akkus et al., "Peer-to-peer multipoint video conferencing with layered video", Journal of Network Computer Applications, 2011, pp. 137-150, vol. 34, Elsevier Ltd.

* cited by examiner

ENDPOINT DEVICE-SPECIFIC STREAM CONTROL FOR MULTIMEDIA CONFERENCING

TECHNICAL FIELD

The present description relates generally to stream control, and more particularly, but not exclusively, to endpoint device-specific stream control for multimedia conferencing.

BACKGROUND

Multiple individual users engaging in a multimedia conference may be able to view and hear one another irrespective of the users' physical locations. In this manner, multimedia conferences may allow disparately located users to participate in activities generally associated with collocated users, such as panel discussions, multi-person interviews, or classes. In one example, a user may have limited bandwidth available for participating in a multimedia conference. Due to the limited bandwidth, the user may receive low quality video streams corresponding to each of the other participants in the multimedia conference.

SUMMARY

The disclosed subject matter relates to a computer-implemented method for endpoint device-specific stream control for multimedia conferencing. The method may include providing, using one or more computing devices, a hosted multimedia conference to a plurality of participant devices. The method may further include providing, using the one or more computing devices, video stream controls to each of the plurality of participant devices, wherein the video stream controls provide for controlling video stream transmissions to each of the plurality of participant devices, the video stream transmissions corresponding to a plurality of video streams provided by the other of the plurality of participant devices. The method may further include receiving, using the one or more computing devices, first selections of at least some of the video stream controls from each the plurality of participant devices. The method may further include controlling, using the one or more computing devices, the video stream transmissions, to each of the plurality of participant devices, of the plurality of video streams corresponding to each of the other of the plurality of participant devices based at least in part on the first selections of the at least some of the video stream controls received from each of the plurality of participant devices.

In another aspect, a computer-implemented method for controlling endpoint-specific streams from an endpoint device in a multimedia conference may include participating, using one or more computing devices, in a multimedia conference with a plurality of participant devices. The method may further include receiving, using the one or more computing devices, video stream controls corresponding to the plurality of participant devices in the multimedia conference that are capable of providing video streams. The method may further include receiving a selection, using the one or more computing devices, of one or more of the video stream controls. The method may further include receiving, using the one or more computing devices, a plurality of video streams of the plurality of participant devices corresponding exclusively to the one or more selected video stream controls.

The disclosed subject matter also relates to a system for endpoint device-specific stream control for multimedia conferencing. The system may include one or more processors and a memory including instructions that, when executed by the one or more processors, cause the one or more processors to perform the steps of: providing a hosted multimedia conference to a plurality of participant devices, determining whether each of the plurality of participant devices is capable of providing a video stream transmission, providing, to each of the plurality of participant devices, a plurality of video stream controls that provide for controlling a plurality of video streams of exclusively the other of the plurality of participant devices that are determined to be capable of providing the video stream transmission, receiving a selection of a first video stream control of the plurality of video stream controls that corresponds to a first participant device of the plurality of participant devices, wherein the selection is received from a second participant device and a third participant device of the plurality of participant devices, receiving a first video stream of the plurality of video streams from the first participant device of the plurality of participant devices, and providing the first video stream of the first participant device to the second participant device and the third participant device based at least in part on the received selection of the first video stream control by the second participant device and the third participant device.

The disclosed subject matter also relates to a machine-readable medium comprising instructions stored therein, which when executed by a machine, cause the machine to perform a method for controlling endpoint-specific streams from an endpoint device in a multimedia conference that includes providing a hosted multimedia conference to a plurality of participant devices. The method may further include determining whether each of the plurality of participant devices is capable of providing a video stream transmission. The method may further include providing, to each of the plurality of participant devices, a plurality of video stream controls that provide for controlling a plurality of video streams of exclusively the other of the plurality of participant devices that are determined to be capable of providing the video stream transmission. The method may further include receiving a deselection of a first video stream control of the plurality of video stream controls that corresponds to a first participant device of the plurality of participant devices, wherein the deselection is received from a second participant device and a third participant device of the plurality of participant devices. The method may further include providing, to the second participant device and the third participant device, a plurality of video streams of the other of the plurality of participant devices that are determined to be capable of providing the video stream transmission exclusive of the first video stream of the first participant device based at least in part on the received deselection of the first video stream control by the second participant device and the third participant device.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
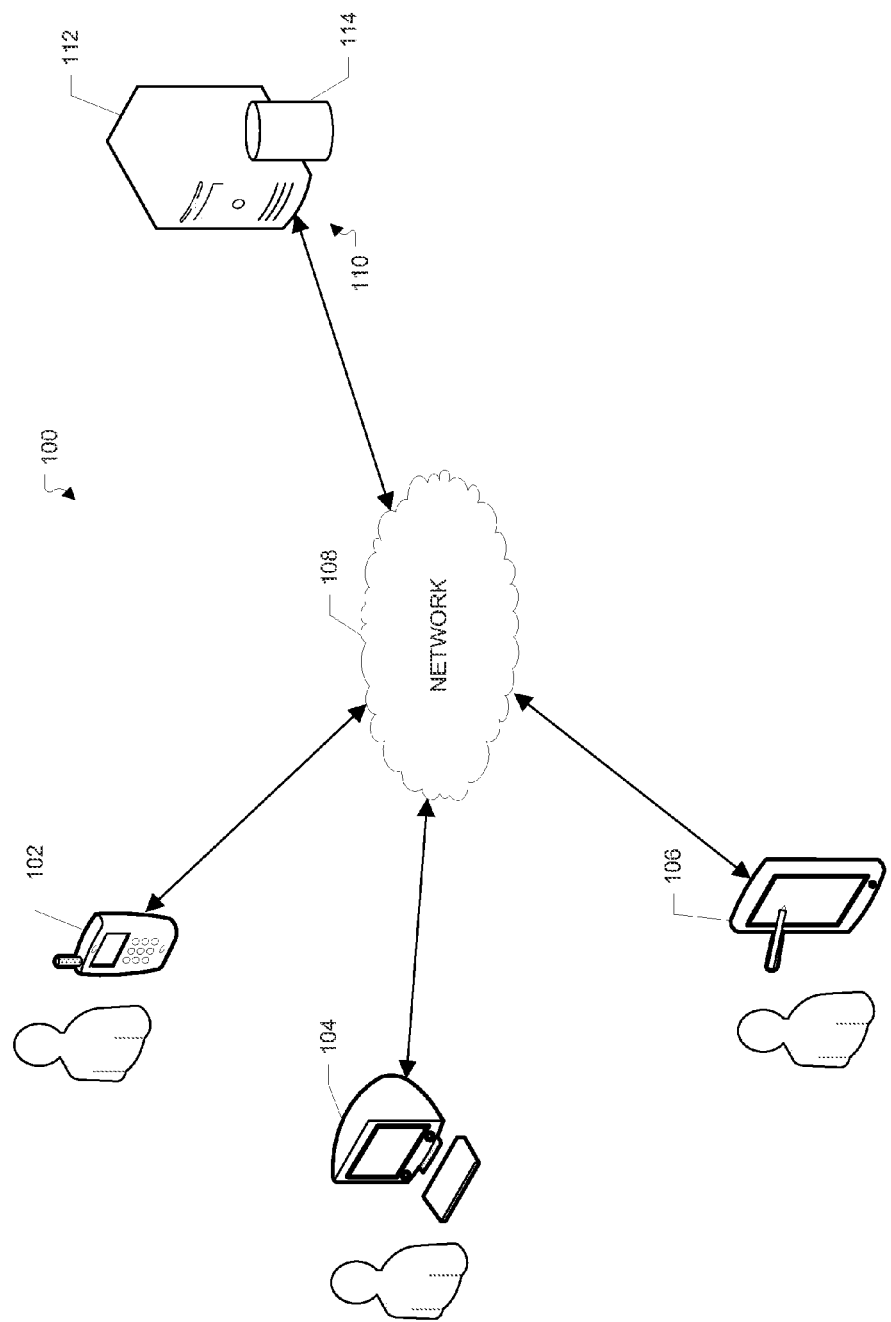
FIG. 1 illustrates an example client-server network environment that may implement endpoint device-specific stream control for multimedia conferencing.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

I. Overview

Hosted multimedia conferencing technology enables individual users located in disparate geographic locations, and operating disparate devices, e.g. devices having different operating systems, different screen resolutions, different processing capabilities, etc., to engage in a multimedia conference without the need for each user to possess expensive video conferencing equipment. For example, some users may engage in a hosted multimedia conference using web browser-enabled devices, such as devices that can provide graphical user interfaces to the users for controlling features of the multimedia conference, while other users may engage in the hosted multimedia conference using dedicated video conferencing endpoints. In this manner, hosted multimedia conferencing may allow users having disparate devices to view and/or hear one another, such as in order to participate in panel discussions, multi-person interviews, or classes, irrespective of the users' geographic locations and with minimal user device requirements.

A hosting device may host a multimedia conference among multiple participants. The hosting device may be a server, one or more devices of the participants, or any combination thereof. The device of each participant in the multimedia conference may be referred to as an endpoint device or a participant device. Each participant device may provide audio and/or video streams to the hosting device, depending upon each device's capabilities. The hosting device may, in response to receiving the audio and/or video streams from each participant device, transmit the audio and/or video streams to each of the other participant devices. The hosting device and/or a person administrating the multimedia conference, may control which audio and/or video streams are transmitted to each participant device. Thus, individual participants in the multimedia conference may be unable to control the audio and/or video streams that are transmitted to their endpoint device. Accordingly, bandwidth may be not be effectively utilized when unwanted audio and/or video streams are transmitted to participant devices in the multimedia conference.

In order to optimize the bandwidth used by the audio and/or video stream transmissions of the multimedia conference, the hosting device may process and/or control the audio and/or video streams prior to transmission based on the bandwidth availability of each of the participant devices. For example, the hosting device may decrease the quality of the audio and/or video streams of participant devices in the multimedia conference that are not presently communicating, such as by decreasing the bit rate of the audio and/or video streams. However, the hosting device may be unable to determine preferences specific to each of the individual participant devices with regards to the audio and/or video streams transmissions. For example, a first participant device may not wish to receive a video stream corresponding to a second participant device, regardless of whether the second participant device is presently communicating. Accordingly, bandwidth usage may be further optimized if the hosting device terminated the unwanted transmission of the video stream of the second participant device to the first participant device, irrespective of whether the second participant device is presently communicating. However, the hosting device, and/or a user administrating the multimedia conference, may be unaware of these individual preferences of each participant device, and therefore bandwidth may be wasted on unwanted audio and/or video stream transmissions.

In an endpoint device-specific stream control system for multimedia conferencing, a hosting device may provide each endpoint device in a multimedia conference with a mechanism for controlling the individual audio and/or video streams transmitted to the endpoint device. In this manner, each endpoint device may individually control the transmissions, to the endpoint device, of the audio and/or video streams of the other participant devices in a multimedia conference, irrespective of the hosting device and/or a user administrating the multimedia conference. In one example, the hosting device may provide each endpoint device with individual stream controls for starting and/or stopping each of the audio and/or video streams received from each of the other participant devices, such as video stream controls and audio stream controls.

The hosting device may also provide each participant device with a mechanism for controlling the quality of each of the individual audio and/or video streams transmitted to the participant device, such that, in one example, each individual audio and/or video stream may be transmitted to each participant device with a disparate quality. Alternatively, or in addition, the hosting device may provide each participant device with a mechanism for controlling any parameter corresponding to each individual audio and/or video stream being transmitted to each participant device, such as any parameter that may affect the bandwidth usage of the multimedia conference. For example, for each individual audio and/or video stream being transmitted to a participant device, the participant device may be able to control the bit rate, size, frame rate, encoding or compression algorithms, or generally any parameters that may affect bandwidth usage.

Alternatively, or in addition, the hosting device may provide each participant device with a mechanism for achieving similarly discrete control over the quality of the audio and/or video streams transmitted to the participant device without requiring the participant device to configure individual encoding parameters for each of the audio and/or video streams. For example, the hosting device may provide each participant device with a mechanism for allocating available bandwidth to each of the received audio and/or video stream transmissions corresponding to the other participant devices. In this manner, discrete control over the quality of the audio and/or video streams can be achieved without specific knowledge of the encoding parameters corresponding to the audio and/or video streams. For example, the hosting device may provide each participant device with a mechanism for allocating a percentage of the available bandwidth to each of the received audio and/or video stream transmissions corresponding to the other participant devices. Upon receiving a bandwidth allocation from a participant device, the hosting device may determine the appropriate encoding and/or transmission parameters such that each audio and/or video stream is transmitted to the participant device in accordance with the bandwidth allocation received from the participant device.

For example, in a multimedia conference with seven participant devices, the aforementioned mechanism may allow a first participant device to allocate ninety-five percent of the available bandwidth to the audio and/or video streams corresponding to a second participant device, and to allocate one percent of the available bandwidth to the audio and/or video streams corresponding to each of the five other participant devices. The hosting device may receive the first participant device's bandwidth allocations and may determine the appropriate encoding and/or transmission parameters such that the audio and/or video streams of the second participant device are transmitted to the first participant device using ninety-five percent of the available bandwidth and the audio and/or video streams of each the other five participant devices are each transmitted to the first participant device using one percent of the available bandwidth.

Alternatively, or in addition, the hosting device may provide each participant device with a mechanism for classifying the other participants in a multimedia conference, or other users who are not presently participating in the multimedia conference. The classification of the other participants may be used to determine the quality of the audio and/or video stream transmissions of the devices of the other participants that are provided to each participant device. For example, audio and/or video stream transmissions for devices of participants that are classified as important may be transmitted from the hosting device at a higher quality than audio and/or video streams transmission for participant devices that are classified as unimportant. In one example, the hosting device may provide each participant device with a mechanism for classifying users in their social network, irrespective of whether the multimedia device is presently participating in a multimedia conference with the users. In this example, the participant device may provide a different classification for each user, group of users, or circle of users, in their social network. The hosting device may then determine a corresponding quality for transmitting audio and/or video streams corresponding to each user based on the social network classifications.

In another example, the endpoint device-specific stream control system may operate in conjunction with a hosting device stream control system to optimize the quality of the audio and/or video streams transmitted to an endpoint device while concurrently optimizing bandwidth usage. For example, if an endpoint device utilizes an endpoint device-specific stream control system to terminate transmission of an audio and/or video stream corresponding to a participant device in a multimedia conference, additional bandwidth may become available to the end point device due to the termination of the audio and/or video streams. In this instance, the hosting device may reallocate the available bandwidth to the audio and/or video streams of the other participant devices that are being transmitted to the endpoint device. For example, the hosting device may reallocate the bandwidth equally among the audio and/or video streams of the other participant devices. Alternatively, or in addition, the hosting device may reallocate the bandwidth in accordance with a bandwidth allocation algorithm used by the hosting device, such as in a hosting device stream control system. For example, the hosting device may allocate a larger proportion of the bandwidth to the audio and/or video streams of any communicating participant devices, while allocating a smaller proportion of the available bandwidth to the audio and/or video streams of any non-communicating participant devices. Alternatively, or in addition, the hosting device may reallocate the bandwidth in accordance with any device and/or user classifications provided by the endpoint device.

The hosting device may provide mechanisms for enabling the endpoint device-specific stream control in one or more forms. For example, if a participant device is capable of displaying a graphical user interface for accessing a multimedia conference, the hosting device may provide stream controls within the graphical user interface that correspond to each of the other participant devices. The stream controls corresponding to the other participant devices may be selectable by the participant device, such as to start or terminate the transmissions to the participant device of the audio and/or video streams corresponding to the other participant devices.

In one example, the hosting device may only provide stream controls corresponding to a participant device if the participant device is capable of providing audio and/or video streams, i.e. the hosting device may not provide stream controls corresponding to participant devices that are not capable of providing audio and/or video streams. In this manner, the user experience in the multimedia conference may be improved by preventing participant devices from requesting audio and/or video streams from other participant devices that are incapable of providing the audio and/or video streams. Furthermore, bandwidth may be conserved by preventing unnecessary control signaling messages between the participant devices and the hosting device, e.g. control signaling messages requesting audio and/or video streams from a participant device that is incapable of providing the audio and/or video streams.

In some instances, a participant device may only be able to control the audio and/or video streams of another participant device if the another participant device is presently transmitting the audio and/or video streams to the hosting device. In these instances, the stream controls corresponding to the other participant devices may indicate whether the other participant devices are presently transmitting audio and/or video streams to the hosting device. For example, the color of a control corresponding to a participant device may change when the participant device is presently transmitting audio and/or video streams to the hosting device. Alternatively, or in addition, the stream controls corresponding to the other participant devices may only be selectable by the participant device if the other participant devices are presently transmitting audio and/or video streams.

Alternatively, or in addition, if a participant device is not capable of providing a graphical user interface for endpoint device-specific stream control, such as a device that does not include a display, or a device that does not include an interactive display, the hosting device may provide an alternative mechanism for controlling the audio and/or video streams of the other participant devices. For example, the hosting device may provide an interactive response system, such as an interactive voice response system, to allow a participant device to control the audio and/or video streams corresponding to the other participant devices. Alternatively, or in addition, the hosting device may allow the participant devices to provide voice commands for controlling the audio and/or video streams of the other participant devices. In one example, the hosting device may allow the participant devices to provide the voice commands irrespective of whether the participant devices are capable of providing a graphical user interface for endpoint device-specific stream control.

The hosting device may also provide one or more access controls in conjunction with the endpoint device stream control system, such as to prevent the unauthorized transmission of the audio and/or video streams of the participant devices. For example, when a participant device joins a multimedia conference, the participant device may provide its audio and/or video capabilities to the hosting device. If the hosting device verifies that the participant device is capable of providing audio and/or video streams, the hosting device may provide the participant device with a mechanism for authorizing the transmission of their audio and/or video streams to the other participant devices in the multimedia conference. If the participant device authorizes the transmission of their audio and/or video streams to the other participant devices, then the other participant devices may be provided with one or more stream controls for controlling the audio and/or video streams of the participant device.

In one example, a participant device in a multimedia conference may initiate transmission of its own audio and/or video streams to the hosting device. Upon receiving the audio and/or video streams from the participant device, the hosting device may send a request to each of the other participant devices for transmission of their audio and/or video streams. The other participant devices may accept the request from the hosting device, and may then initiate transmission of their audio and/or video streams to the hosting device. Alternatively, the other participant devices may deny the request from the hosting device, and therefore may not transmit their audio and/or video streams to the hosting device.

The hosting device may also allow a participant device to set a global parameter for globally authorizing, or globally deauthorizing, the transmission of their audio and/or video streams in any multimedia conference that the participant device joins. Alternatively, or in addition, the hosting device may allow a participant device to create an access control list that identifies other participant devices that are authorized to control the audio and/or video streams of the participant device, such as by starting or stopping transmission of the audio and/or video streams of the participant device, irrespective of whether the participant device is presently transmitting the audio and/or video streams to the hosting device. The access control list created by the participant device may supersede any other access control settings for the participant device. In this manner, a participant device may authorize the transmission of their audio and/or video streams to the particular participant devices included on their access control list, even when the participant device has globally deauthorized the transmission of their audio and/or video streams.

In one example, if an access control list authorized participant device starts an audio and/or video stream of another participant device during a multimedia conference, the audio and/or video streams of the another participant device may be available to any of the other participant devices in the multimedia conference. In other words, once an authorized participant device starts the transmission of audio and/or video streams of another participant device, any other participant device in the multimedia conference may then be able to receive the audio and/or video streams of the another participant device, even if the other participant devices were not included on the access control list of the another participant device.

Alternatively, or in addition, a participant device may create a second access control list that authorizes other participant devices to control any other functions of the participant device, i.e. any other functions in addition to starting and/or stopping the transmission of audio and/or video streams from the participant device. For example, a participant device authorized by a second access control list of another participant device may be able to control a camera of the another participant device that is providing a video stream, such as by controlling the pan, tilt, or zoom of the camera, or changing to another camera on the another participant device, or the participant device may be able to generally control any other aspects of the another participant device.

II. Example Client-Server Network Environment for Endpoint Device-Specific Control for Multimedia Conferencing FIG. 1 illustrates an example client-server network environment which may implement endpoint device-specific stream control for multimedia conferencing. Network environment 100 may include a number of electronic devices 102, 104, 106 communicably connected to server 110, such as by network 108. In another example, electronic devices 102, 104, 106 may be communicably connected to one another, such as by network 108, but not communicably connected to server 110. Network 108 may be a public communication network (such as the Internet, cellular data network, dialup modems over a telephone network) or a private communications network (such as private local area network ("LAN"), leased lines). Network 108 may also include, but is not limited to, any one or more of the following network topologies, including a bus network, a star network, a ring network, a mesh network, a star-bus network, a tree or hierarchical network, and the like.

In some example embodiments, electronic devices 102, 104 and 106 can be computing devices such as laptop or desktop computers, smartphones, personal digital assistants ("PDAs"), portable media players, tablet computers, televisions or other displays with one or more processors coupled thereto and/or embedded therein, or other appropriate computing devices that can be used for displaying a web page or web application. In the example of FIG. 1, electronic device 102 is depicted as a desktop computer, electronic device 104 is depicted as a smartphone, and electronic device 106 is depicted as a tablet device.

In one example, server 110 includes one or more processing devices 112 and data store 114. The one or more processing devices 112 execute computer instructions stored in data store 114, for example, to provide a system for endpoint device-specific stream control for multimedia conferencing to one or more of electronic devices 102, 104, 106. Data store 114 may store the computer instructions on non-transitory computer-readable medium.

In one example, server 110 may be a single computing device such as a computer server. In another example, server 110 may represent more than one computing device working together to perform the actions of a server computer (such as a cloud of computers and/or a distributed system). In another example, server 110 may be coupled with various databases, storage services, or other computing devices. Server 110 and the coupled databases, storage services, or other computing devices may be collocated, or may be disparately located.

Communications between electronic devices 102, 104, 106, and server 110 may be facilitated through the Hypertext Transfer Protocol ("HTTP") communication protocol. Other communication protocols may also be used including, for example, Extensible Messaging and Presence Protocol (XMPP) communication, for some or all communications between electronic devices 102, 104, 106 and server 110. In another example, electronic devices 102, 104, 106 may be in communication with one another without communicating with server 110.

Users interacting with electronic devices 102, 104, 106 may participate in a multimedia conference. The phrase "multimedia conference" as used herein encompasses its plain and ordinary meaning and, if not otherwise included in its plain and ordinary meaning, may also refer to a video conference between two or more of electronic devices 102, 104, 106, where each electronic device 102, 104, 106 transmits a video and/or audio stream, and each electronic device 102, 104, 106 receives a video and/or audio stream from at least one other of electronic devices 102, 104, 106. Accordingly, electronic devices 102, 104, 106, may include, or may be coupled to, a camera, or other device for capturing video and/or audio, and may include an output device for viewing video and/or hearing audio.

Electronic devices 102, 104, 106 may also be referred to as endpoint devices. The phrase "endpoint device" as used herein encompasses its plain and ordinary meaning and, if not otherwise included in its plain and ordinary meaning, may also refer to any device that is capable of participating in a multimedia conference, such as any device that is capable of providing an audio stream and/or a video stream to another device and/or receiving an audio stream and/or a video stream from another device.

In one example electronic devices 102, 104, 106 may establish a multimedia conference session with server 110 in order to participate in a multimedia conference. The phrase "multimedia conference session" as used herein encompasses its plain and ordinary meaning and, if not otherwise included in its plain and ordinary meaning, may also refer to interactions between electronic devices 102, 104, 106 and server 110 with regards to a multimedia conference, and any data, state information, and/or control information associated with the interactions.

In one example, if users interacting with electronic devices 102, 104, 106 are participating in a multimedia conference hosted by server 110, electronic devices 102, 104, 106, may transmit audio streams and/or video streams to server 110. The phrase "hosting device" as used herein encompasses its plain and ordinary meaning and, if not otherwise included in its plain and ordinary meaning, may also refer to a device that is hosting a multimedia conference. The hosting device, such as server 110, may transmit the audio stream and/or video stream of each electronic device 102, 104, 106 to the other electronic devices 102, 104, 106.

In operation, server 110 may provide a multimedia conference to electronic devices 102, 104, 106 such as by hosting the multimedia conference. Electronic devices 102, 104, 106 may each establish a multimedia conference session with server 110, for purposes of participating in the multimedia conference. Server 110 may provide stream controls to each of electronic devices 102, 104, 106 that provide for controlling the audio and/or video streams of each of the other electronic devices 102, 104, 106. The stream controls may allow each of electronic devices 102, 104, 106 to control the transmission, from server 110 to each of electronic devices 102, 104, 106, of the audio and/or video streams corresponding to the other electronic devices 102, 104, 106.

The phrase "stream controls" as used herein encompasses its plain and ordinary meaning and, if not otherwise included in its plain and ordinary meaning, may also refer to any mechanism for controlling transmissions of one or more audio and/or video streams, such as starting or stopping the transmissions, and/or for controlling any aspect related thereto, such as for controlling the quality of the transmissions, the bandwidth allocated to the transmissions, encoding parameters, compression parameters, or any other parameters used for the transmissions, such as bit rate, size, frame rate, encoding or compression algorithms, or generally any parameters that may affect bandwidth usage. The phrase "video stream controls" as used herein encompasses its plain and ordinary meaning and, if not otherwise included in its plain and ordinary meaning, may also refer to the aforementioned phrase "stream controls" as applied specifically to video streams. The phrase "audio stream controls" as used herein encompasses its plain and ordinary meaning and, if not otherwise included in its plain and ordinary meaning, may also refer to the aforementioned phrase "stream controls" as applied specifically to audio streams.

For example, server 110 may provide stream controls, such as audio stream controls and/or video stream controls, to electronic device 102 that correspond to each of the other electronic devices 104, 106. In one example, server 110 may only provide audio and/or video stream controls for the other electronic devices 104, 106 that are capable of providing audio and/or video streams, respectively. In this manner, electronic device 102 may not receive a control for starting an audio stream and/or video stream corresponding to an electronic device 104, 106 that is not capable of providing the audio stream and/or video stream.

The stream controls may provide for controlling the transmission, from server 110 to electronic device 102, of the audio and/or video streams corresponding to each of the other electronic devices 104, 106. Electronic device 102 may present the stream controls to a user interacting with electronic device 102. Example user interfaces for presenting stream controls are discussed further below and shown in FIGS. 5 and 6. An example process for receiving and interacting with stream controls is discussed further below with regards to FIG. 4.

In one example, the audio and/or video streams of electronic devices 102, 104, 106 may be transmitted to the other electronic devices 102, 104, 106 when the multimedia conference begins, or when electronic devices 102, 104, 106 join the multimedia conference. In this example, the audio and/or video stream controls corresponding to the audio and/or video streams of electronic devices 102, 104, 106 may be initially presented to the other electronic devices 102, 104, 106 as selected audio and/or video stream controls. Alternatively, the audio and/or video streams of electronic devices 102, 104, 106 may not be transmitted to the other electronic devices 102, 104, 106 when the multimedia conference begins, or when electronic devices 102, 104, 106 join the multimedia conference. In this example, the audio and/or video stream controls corresponding to the audio and/or video streams of electronic devices 102, 104, 106 may be initially presented to the other electronic devices 102, 104, 106 as deselected audio and/or video stream controls.

A user interacting with electronic device 102 may select or deselect one or more stream controls corresponding to one or more of electronic devices 104, 106. Electronic device 102 may transmit the one or more selections and/or deselections to server 110. Server 110 may control the transmissions of the audio and/or videos streams to electronic device 102, based at least in part on the one or more selections and/or deselections of the stream controls received from electronic device 102. Example processes for providing stream controls to electronic devices 102, 104, 106 and controlling audio and/or video stream transmissions to electronic devices 102, 104, 106 are discussed further below with regards to FIGS. 2 and 3.

Figure 2:
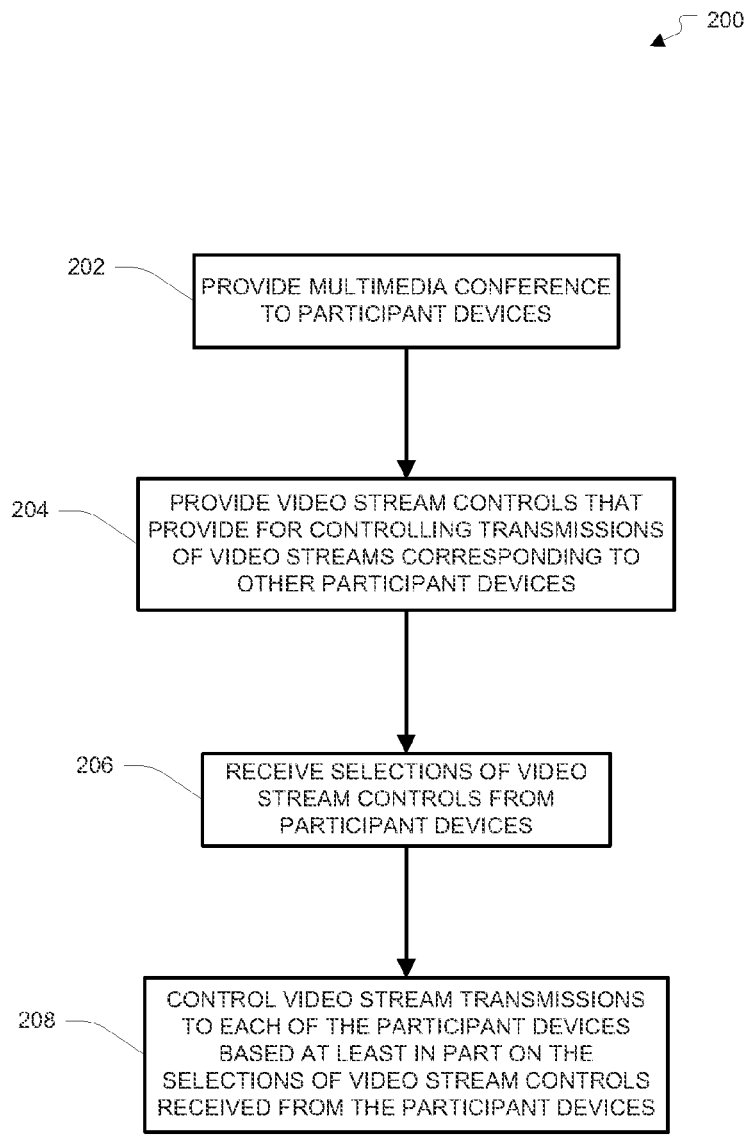
FIG. 2 illustrates a flow diagram of an example process for endpoint device-specific stream control for multimedia conferencing.

III. Example Processes for Endpoint Device-Specific Control for Multimedia Conferencing FIG. 2 illustrates a flow diagram of an example process 200 for endpoint device-specific control for multimedia conferencing. For explanatory purposes, example process 200 is described herein with reference to the example network environment 100 of FIG. 1; however, example process 200 is not limited to the example network environment 100 of FIG. 1. In block 202, a hosting device, such as server 110, provides a multimedia conference, or other hosted service, to one or more participant devices, such as electronic devices 102, 104, 106. For example, electronic devices 102, 104, 106 may each establish an individual multimedia conference session with server 110. Server 110 may then receive audio and/or video streams from one or more of electronic devices 102, 104, 106.

In block 204, server 110 provides, to each device participating in the multimedia conference, such as electronic devices 102, 104, 106, video stream controls that provide for individually controlling video stream transmissions corresponding to the other devices participating in the multimedia conference, such as electronic devices 102, 104, 106. Alternatively, or in addition, server 110 may only provide video stream controls corresponding to the other electronic devices 102, 104, 106 participating in the multimedia conference that are capable of providing a video stream.

For example, server 110 may provide electronic device 102 with video stream controls for individually controlling the transmissions, from server 110 to electronic device 102, of video streams corresponding to electronic devices 104, 106. The video stream controls may include a separate stream control for each video stream of each of electronic devices 104, 106. The separate stream controls may provide for individually starting and/or stopping the transmission of each video stream of each of electronic devices 104, 106. In one example, each video stream control may include two separate selectors, one for stopping the corresponding video stream, and one for starting the corresponding video stream. Alternatively, each video stream control may include a single selector that is selected to start the transmission of the corresponding video stream, and deselected to stop the transmission of the corresponding video stream. In this example, the video stream control may be presented to the user as selected when electronic device 102 is receiving the corresponding video stream, and the video stream control may be presented to the user as deselected when electronic device 102 is not receiving the corresponding video stream. Alternatively, or in addition, the presentation of the video stream control may not change based on whether electronic device 102 is receiving the corresponding video stream.

In block 206, server 110 receives selections and/or deselections of one or more video stream controls from one or more of the participant devices, such as electronic devices 102, 104, 106. For example, a user interacting with electronic device 102 may select and/or deselect one or more video stream controls corresponding to the video streams of electronic devices 104, 106. Electronic device 102 may transmit the selections and/or deselections of the user to server 110.

In block 208, server 110 controls video stream transmission to each of the participant devices, such as electronic devices 102, 104, 106, based at least in part on the selections and/or deselections of video stream controls received from each of electronic devices 102, 104, 106. For example, server 110 only transmits video streams to each of electronic devices 102, 104, 106, that correspond to selections of video stream controls received from electronic devices 102, 104, 106. Alternatively, or in addition, server 110 may stop transmission of video streams to electronic devices 102, 104, 106 that correspond to deselections of video stream controls received from electronic devices 102, 104, 106.

In one example, electronic devices 102, 104 may select electronic device 104, but not electronic device 106, and electronic device 106 may select electronic device 104, but not electronic device 102. In this example, electronic devices 102, 104 may receive a video stream transmission from server 110 for only electronic device 106, while electronic device 106 may receive a video stream transmission from server 110 for only electronic device 104. Thus, neither of electronic devices 104, 106 receives a video stream transmission for electronic device 102. However, electronic device 102 may continue to transmit a video stream to server 110, such that server 110 can immediately provide the video stream of electronic device 102 to either of electronic devices 104, 106, upon receiving a selection of electronic device 102 from either of electronic devices 104, 106.

Alternatively, if none of the other participant devices have selected the video stream control corresponding to another one of the participant devices, such as electronic device 102, server 110 may transmit a control message to electronic device 102 indicating that electronic device 102 may stop transmitting a video stream, such as to conserve bandwidth resources. In this example, if electronic device 102 has stopped transmitting the video stream and server 110 receives a selection of a video stream control corresponding to electronic device 102, server 110 may transmit a control message to electronic device 102 indicating that electronic device 102 should start transmitting the video stream.

Figure 3:
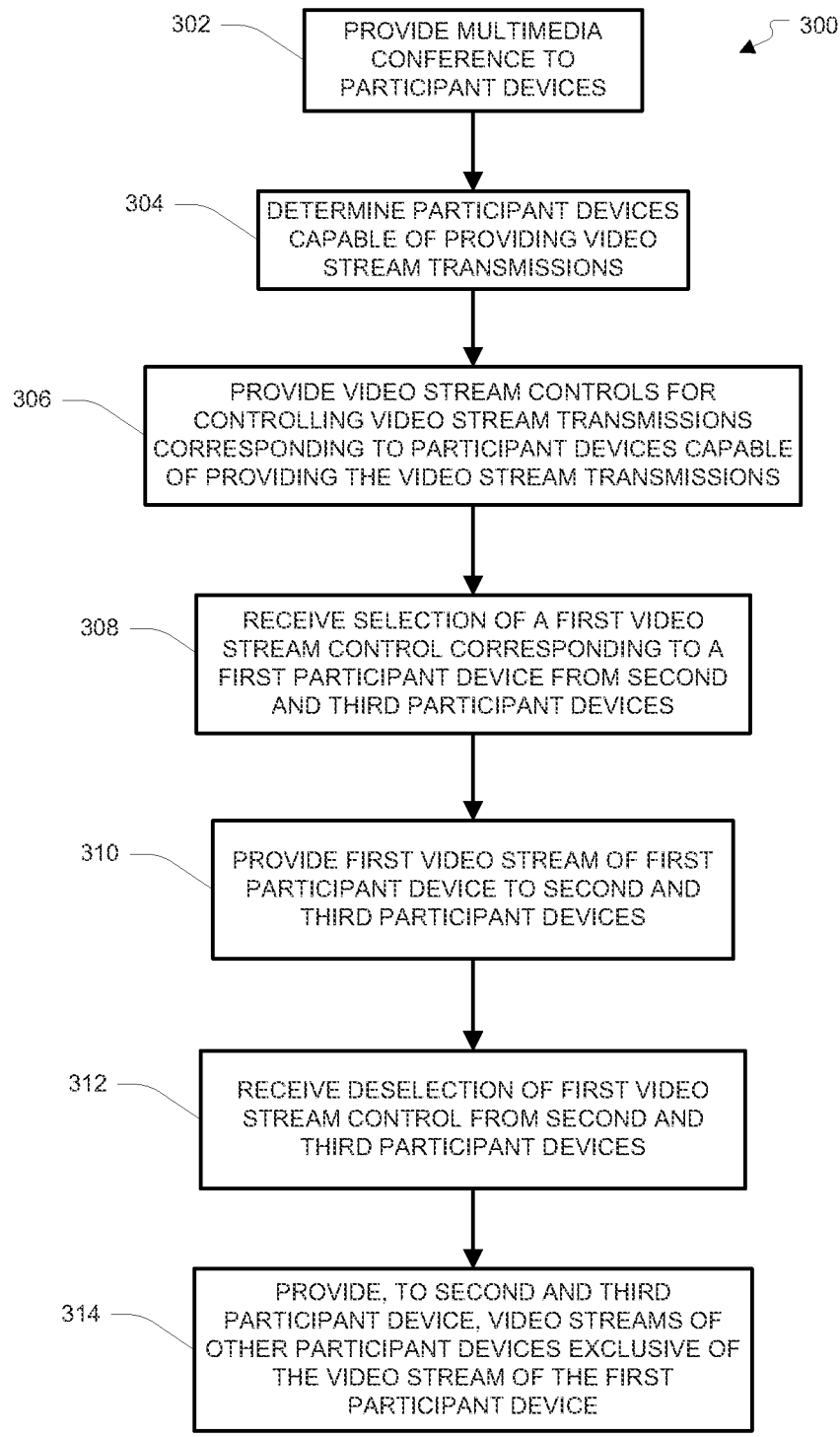
FIG. 3 illustrates a flow diagram of an example process for endpoint device-specific stream control for multimedia conferencing.

FIG. 3 illustrates a flow diagram of an example process 300 for endpoint device-specific control for multimedia conferencing. For explanatory purposes, example process 300 is described herein with reference to the example network environment 100 of FIG. 1; however, example process 300 is not limited to the example network environment 100 of FIG. 1. In block 302, a hosting device, such as server 110, may provide a multimedia conference, or other hosted service, to one or more participant devices, such as electronic devices 102, 104, 106. For example, electronic devices 102, 104, 106 may each establish an individual multimedia conference session with server 110.

In block 304, server 110 determines whether each of electronic devices 102, 104, 106 is capable of providing a video stream transmission. For example, server 110 may request that each electronic device 102, 104, 106 provide an indication of whether electronic device 102, 104, 106 is capable of providing a video stream transmission. Server 110 may store the indication in a data store, such as data store 114. Alternatively, or in addition, server 110 may retrieve a previously stored indication of whether electronic devices 102, 104, 106 can provide a video stream transmission, such as from data store 114. Alternatively, or in addition, server 110 may determine whether electronic devices 102, 104, 106 are capable of providing a video stream transmission from the multimedia conference session information, or from other information provided to server 110 by electronic devices 102, 104, 106, such as a user agent string. Server 110 may then receive audio and/or video streams from electronic devices 102, 104, 106, depending on whether electronic devices 102, 104, 106 are capable of providing the audio and/or video streams.

In block 306, server 110 provides, to each device participating in the multimedia conference, such as electronic devices 102, 104, 106, video stream controls that provide for individually controlling video stream transmissions corresponding to the other devices participating in the multimedia conference that are capable of providing a video stream, such as electronic devices 102, 104, 106. Thus, if in block 304, server 110 determines that electronic device 102 is not capable of providing a video stream transmission, server 110 does not provide a video stream control corresponding to electronic device 102 to electronic devices 104, 106. In this manner, users interacting with electronic devices 104, 106, are not provided with a control for starting a video stream transmission for a participant device that is not capable of providing a video stream, such as electronic device 102.

In block 308, server 110 receives a selection of a first video stream control corresponding to a first participant device, such as electronic device 102, from second and third participant devices, such as electronic devices 104, 106. In block 310, server 110 provides the first video stream of the first participant device, such as electronic device 102, to the second and third participant devices, such as electronic devices 104, 106. Server 110 may also provide electronic devices 104, 106 with video streams corresponding to any other video stream control selections received from electronic devices 104, 106.

In block 312, server 110 receives a deselection of the first video stream control corresponding to the first participant device, such as electronic device 102, from the second and third participant devices, such as electronic devices 104, 106. For example, users interacting with electronic devices 104, 106 may deselect the video stream control corresponding to electronic device 102. In block 314, server 110 may provide to the second and third participant devices, such as electronic devices 104, 106, the video streams corresponding to any other participant devices for which server 110 received a selection of a video stream control from electronic devices 104, 106, exclusive of the first video stream of the first participant device, such as electronic device 102. Thus, since server 110 received a deselection of the video stream control corresponding to electronic device 102 from both of electronic devices 104, 106, server 110 stops transmission of the video stream corresponding to electronic device 102 to electronic devices 104, 106. In one example, the bandwidth resources previously utilized for the transmission to electronic devices 104, 106 of the video stream corresponding to electronic device 102 can be reallocated to other audio and/or video streams being transmitted by server 110 to electronic devices 104, 106.

Figure 4:
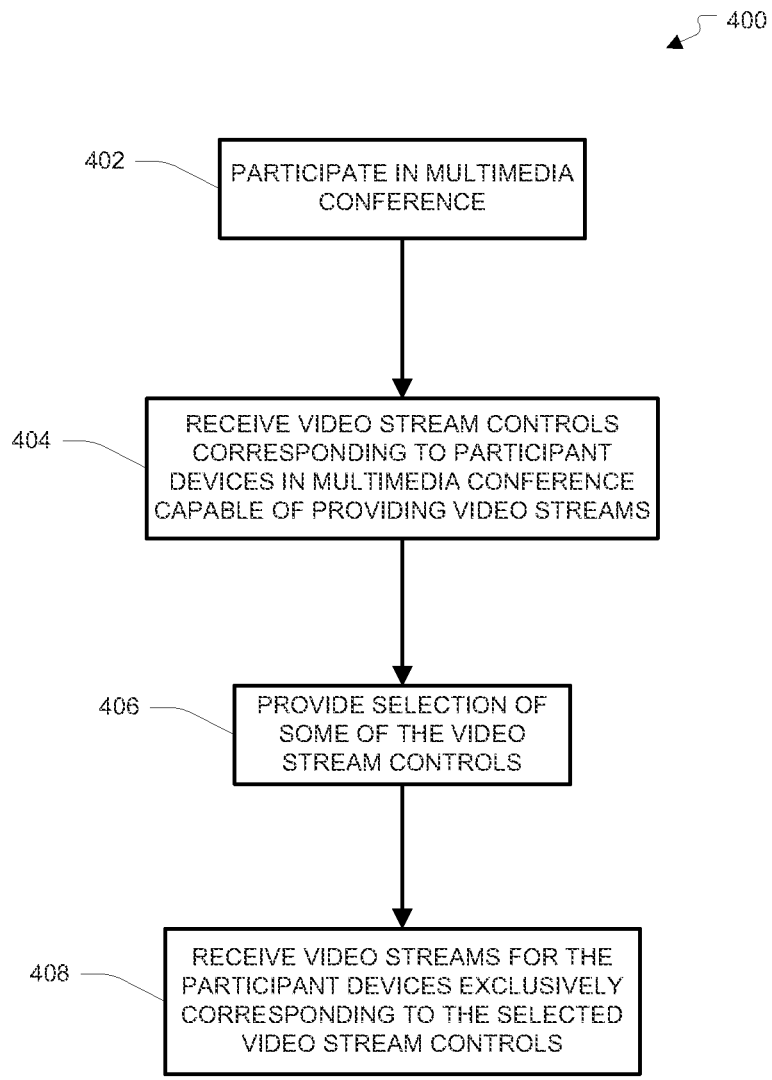
FIG. 4 illustrates a flow diagram of an example process for endpoint device-specific stream control for multimedia conferencing.

FIG. 4 illustrates a flow diagram of an example process 400 for endpoint device-specific control for multimedia conferencing. For explanatory purposes, example process 400 is described herein with reference to the example network environment 100 of FIG. 1; however, example process 400 is not limited to the example network environment 100 of FIG. 1. In block 402, a user joins a multimedia conference hosted by a hosting device, such as server 110, by initiating a multimedia conference session using a first device, such as electronic device 102. For example, the user may initiate the multimedia conference session with server 110. In block 404, electronic device 102 receives video stream controls corresponding to other participant devices in the multimedia conference that are capable of providing a video stream, such as electronic devices 104, 106.

In block 406, electronic device 102 provides, to server 110, selections and/or deselections of one or more of the video stream controls. For example, electronic device 102 may present the received video stream controls to a user through a user interface, such as the user interfaces illustrated in FIGS. 5 and 6. The user may interact with the user interface to select and/or deselect one or more of the video stream controls. Electronic device 102 may then transmit the selections and/or deselections of the user to server 110.

In block 408, electronic device 102 receives video streams that correspond exclusively to the selections of video stream controls that were transmitted to server 110 in block 406. For example, if a user interacting with a user interface presented by electronic device 102 selected a video stream control corresponding to electronic device 104, but did not select a video stream control corresponding to electronic device 106, then electronic device 102 may receive exclusively a video stream corresponding to electronic device 104, e.g. electronic device 102 may not receive a video stream corresponding to electronic device 106.

Figure 5:
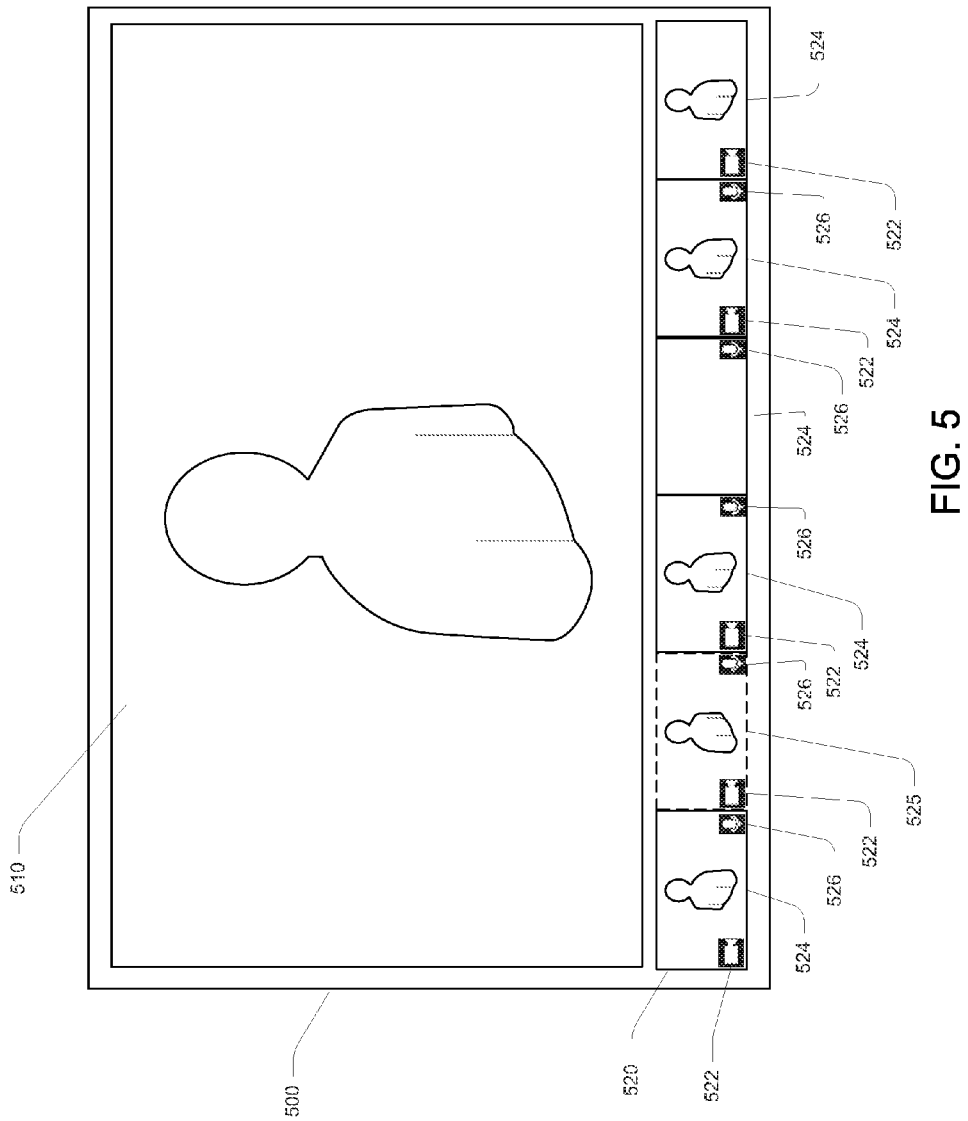
FIG. 5 illustrates an example screenshot of a user interface for endpoint device-specific stream control for multimedia conferencing.

IV. Example User Interfaces for Endpoint Device-Specific Control for Multimedia Conferencing FIG. 5 illustrates an example user interface 500 for endpoint device-specific control for multimedia conferencing. User interface 500 includes a selected participant large display area 510 and a participant filmstrip 520. The participant filmstrip 520 includes one or more participant display areas 524, along with a selected participant display area 525, that each correspond to one of the participant devices in the multimedia conference. If a participant display area 524 corresponds to a participant device that is capable of providing an audio stream transmission, the participant display area 524 includes an audio stream control 526 that provides for control of the audio stream transmission, from server 110, of the audio stream of the corresponding participant device. However, if a participant display area 524 corresponds to a participant device that is not capable of providing an audio stream transmission, or a participant device that has chosen not to provide an audio stream transmission, then the participant display area 524 may not include an audio stream control 526 for the corresponding participant device.

If a participant display area 524 corresponds to a participant device that is capable of providing a video stream transmission, the participant display area 524 includes a video stream control 522 that provides for control of the video stream transmission, from server 110, of the video stream of the corresponding participant device. However, if a participant display area 524 corresponds to a participant device that is not capable of providing a video stream transmission, or a participant device that has chosen not to provide a video stream transmission, then the participant display area 524 may not include a video stream control 522 for the corresponding participant device.

In operation, a participant device, such as electronic device 102, may present the user interface 500 to a user. The user may interact with the user interface 500 to select and/or deselect one or more of the audio stream controls 526 and/or the video stream controls 522 that correspond to the other participants in the multimedia conference. In response to the user selecting and/or deselecting one of the audio stream controls 526 and/or video stream controls 522, electronic device 102 may transmit the selections and/or deselections to server 110.

In response to receiving the selections and/or deselections, server 110 may control the video and/or audio streams being transmitted to electronic device 102, such as by stopping the transmission of any audio and/or video streams corresponding to any deselections received from electronic device 102 and/or starting the transmission of any audio and/or video streams corresponding to any selections received from electronic device 102.

The user may also interact with the user interface 500 to change the video stream displayed in the selected participant large display area 510. For example, the user may select one of the participants from the participant filmstrip, such as by clicking on one of the participant display areas 524. The selected participant large display area 510 may then display the video stream corresponding to the newly selected participant. The display area corresponding to the selected participant in the participant filmstrip 520, e.g. selected participant display area 525, may be modified to distinguish the selected participant display area 525 from the other participant display areas 524. For example, as illustrated in FIG. 5, the selected participant display area 525 may be outlined with a dashed or dotted line.

Figure 6:
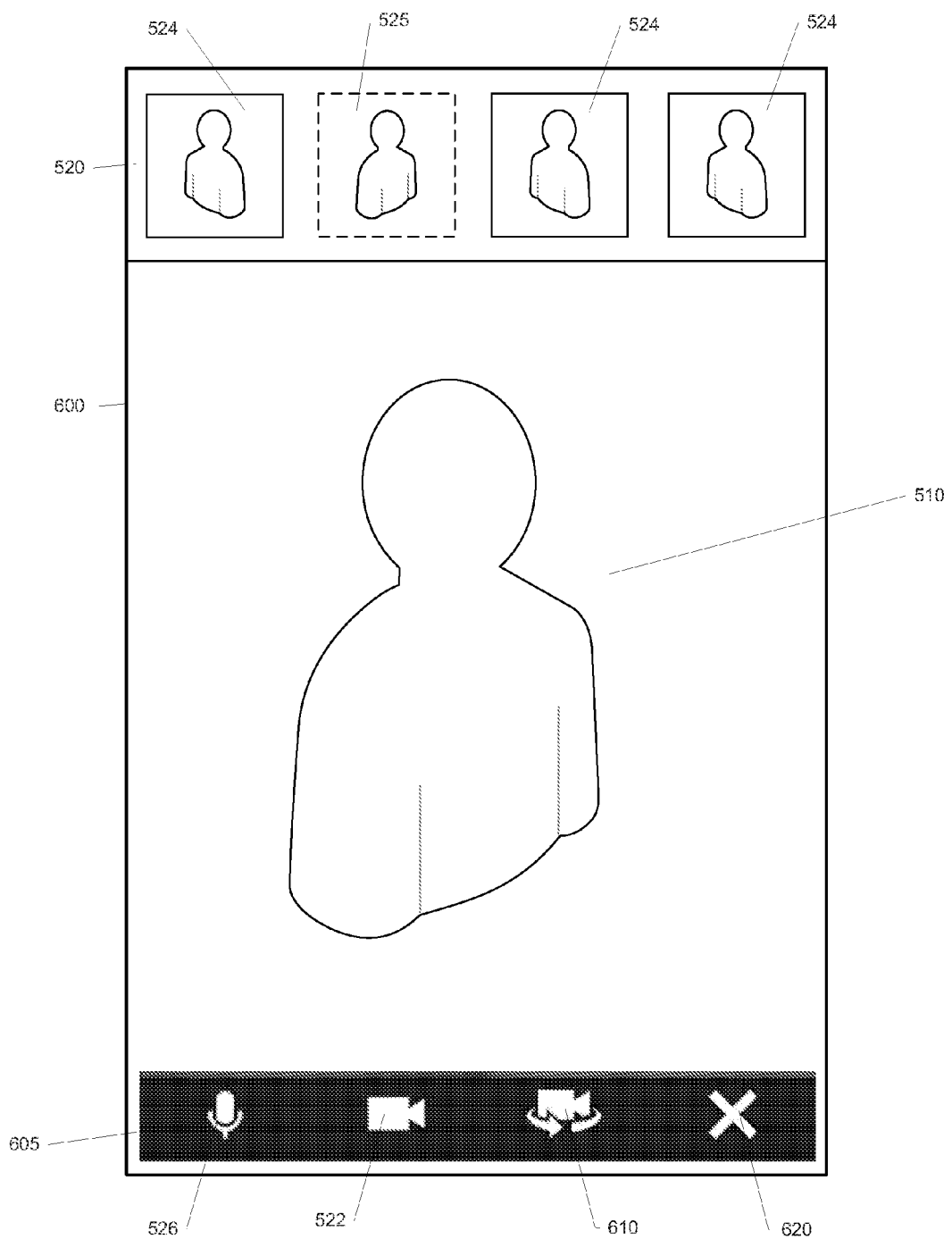
FIG. 6 illustrates an example screenshot of a user interface for endpoint device-specific stream control for multimedia conferencing.

FIG. 6 illustrates an example user interface 600 for endpoint device-specific control for multimedia conferencing. User interface 600 includes a selected participant large display area 510, a participant filmstrip 520, and a controls display area 605. The participant filmstrip 520 includes one or more participant display areas 524, along with a selected participant display area 525, that each correspond to one of the participant devices in the multimedia conference. Controls display area 605 includes an audio stream control 526, a video stream control 522, a camera control 610 and a close participant control 620.

In operation, a participant device, such as electronic device 102, may present the user interface 600 to a user. The user may interact with the controls display area 605 to control the audio and/or video stream transmissions of the participant presently displayed in the selected participant large display area 510. For example, the user may select or deselect the audio stream control 526 to start or stop the audio stream transmission corresponding to the participant presently displayed in the selected participant large display area 510, the user may select or deselect the video stream control 522 to start or stop the video stream transmission corresponding to the participant presently displayed in the selected participant large display area 510, the user may select the camera control 610 to control and/or change the camera corresponding to the participant presently displayed in the selected participant large display area 510, and/or the user may select the close participant control 620 to terminate transmission of audio and/or video streams to and/or from the participant device corresponding to the participant presently displayed in the selected participant large display area 510.

The user may also interact with the user interface 600 to change the video stream displayed in the selected participant large display area 510. For example, the user may select one of the participants from the participant filmstrip 520, such as by clicking on one of the participant display areas 524. The selected participant large display area 510 may then display the video stream corresponding to the newly selected participant. The participant display area corresponding to the selected participant in the participant filmstrip 520, e.g. selected participant display area 525, may be modified to distinguish the selected participant display area 525 from the other participant display areas 524. For example, as illustrated in FIG. 5, the selected participant display area 525 may be outlined with a dashed or dotted line.

After changing the selected participant, the audio stream control 526, video stream control 522, camera control 610, and close participant control 620 may now be used to control the audio and/or video streams corresponding to the newly selected participant, such as the participant presently displayed in the selected participant large display area 510. In this manner, the audio and/or video streams controlled by the controls presented in the control display area 605 may dynamically, or adaptively, change as the selected participant changes. Thus, the same controls 526, 522, 610, 620 are used to control audio and/or video streams of each of the other participants, when the video stream of each of the other participants is displayed in the selected participant large display area 510.

Alternatively, or in addition, if the participant device corresponding to the participant presently displayed in the selected participant large display area 510 is not capable of providing an audio stream, or the participant device has chosen not to provide an audio stream, then the control display area 605 may not present an audio stream control 526 while the participant is displayed in the selected participant large display area 510. Similarly, if the participant device corresponding to the participant presently displayed in the selected participant large display area 510 is not capable of providing a video stream transmission, or the participant device has chosen not to provide a video stream transmission, then the control display area 605 may not present a video stream control 522 or camera control 610 while the participant is displayed in the selected participant large display area 510.

V. Example System for Endpoint Device-Specific Control for Multimedia Conferencing FIG. 7 conceptually illustrates an electronic system with which some implementations of the subject technology are implemented. Electronic system 700 can be a server, computer, phone, PDA, a tablet computer, a television with one or more processors embedded therein or coupled thereto, or generally any electronic device. Such an electronic system includes various types of computer readable media and interfaces for various other types of computer readable media. Electronic system 700 includes a bus 708, processing unit(s) 712, a system memory 704, a read-only memory (ROM) 710, a permanent storage device 702, an input device interface 714, an output device interface 706, and a network interface 716.

Bus 708 collectively represents all system, peripheral, and chipset buses that communicatively connect the numerous internal devices of electronic system 700. For instance, bus 708 communicatively connects processing unit(s) 712 with ROM 710, system memory 704, and permanent storage device 702.

From these various memory units, processing unit(s) 712 retrieves instructions to execute and data to process in order to execute the processes of the subject disclosure. The processing unit(s) can be a single processor or a multi-core processor in different implementations.

ROM 710 stores static data and instructions that are needed by processing unit(s) 712 and other modules of the electronic system. Permanent storage device 702, on the other hand, is a read-and-write memory device. This device is a non-volatile memory unit that stores instructions and data even when electronic system 700 is off. Some implementations of the subject disclosure use a mass-storage device (such as a magnetic or optical disk and its corresponding disk drive) as permanent storage device 702.

Other implementations use a removable storage device (such as a floppy disk, flash drive, and its corresponding disk drive) as permanent storage device 702. Like permanent storage device 702, system memory 704 is a read-and-write memory device. However, unlike storage device 702, system memory 704 is a volatile read-and-write memory, such a random access memory. System memory 704 stores some of the instructions and data that the processor needs at runtime. In some implementations, the processes of the subject disclosure are stored in system memory 704, permanent storage device 702, and/or ROM 710. For example, the various memory units may include instructions for processing, generating, and/or providing verification requests and/or verification responses in accordance with some implementations. From these various memory units, processing unit(s) 712 retrieves instructions to execute and data to process in order to execute the processes of some implementations.

Bus 708 also connects to input and output device interfaces 714 and 706. Input device interface 714 enables the user to communicate information and select commands to the electronic system. Input devices used with input device interface 714 include, for example, alphanumeric keyboards and pointing devices (also called "cursor control devices"). Output device interfaces 706 enables, for example, the display of images generated by the electronic system 700. Output devices used with output device interface 706 include, for example, printers and display devices, such as cathode ray tubes (CRT) or liquid crystal displays (LCD). Some implementations include devices such as a touchscreen that functions as both input and output devices.

Figure 7:
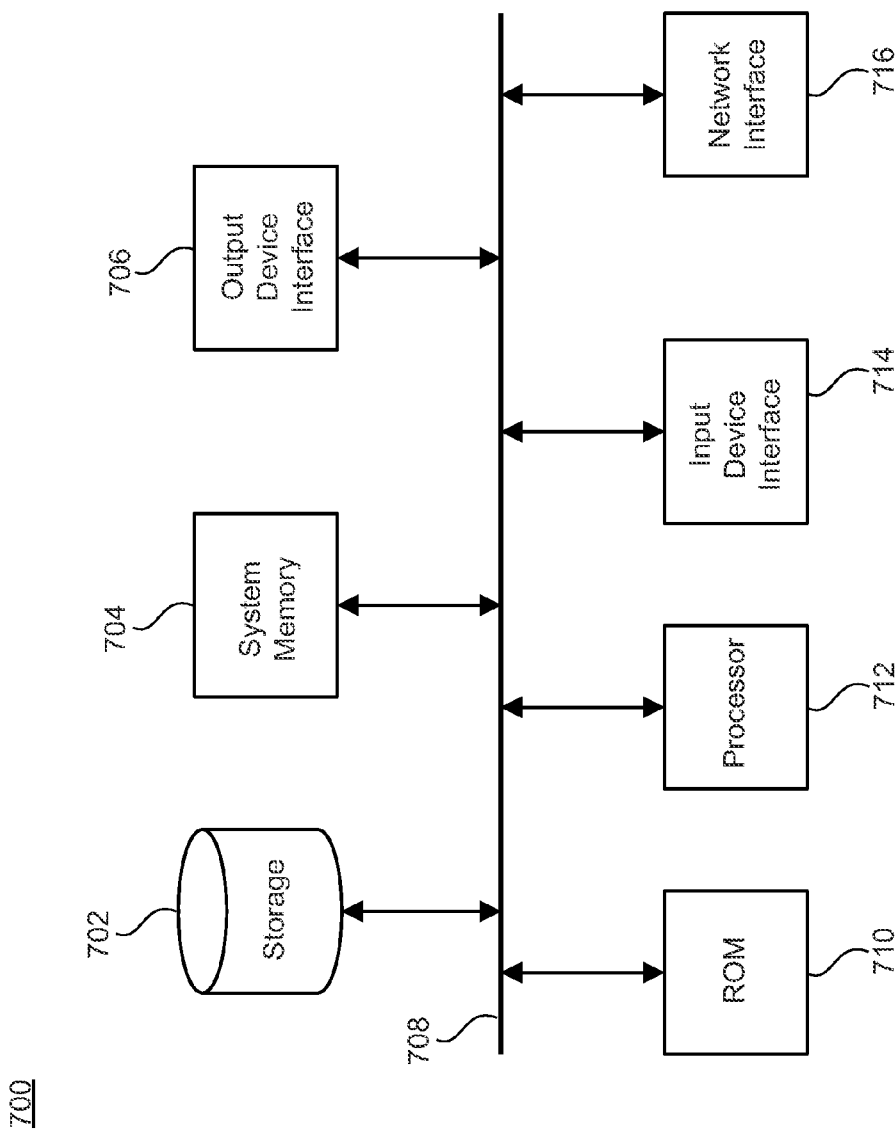
FIG. 7 conceptually illustrates an electronic system with which some implementations of the subject technology may be implemented.

Finally, as shown in FIG. 7, bus 708 also couples electronic system 700 to a network (not shown) through a network interface 716. In this manner, the computer can be a part of a network of computers (such as a local area network ("LAN"), a wide area network ("WAN"), or an Intranet, or a network of networks, such as the Internet. Any or all components of electronic system 700 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms "display" or "displaying" means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, such as a CRT (cathode ray tube) or LCD (liquid crystal display) monitor, for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, such as a data server, or that includes a middleware component, such as an application server, or that includes a front end component, such as a client computer having a graphical user interface or a Web browser through which a user can interact with an implementation of the subject matter described in this specification, or any combination of one or more such back end, middleware, or front end components. The components of the system can be interconnected by any form or medium of digital data communication, such as a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Some of the blocks may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The term website, as used herein, may include any aspect of a website, including one or more web pages, one or more servers used to host or store web related content, and the like. Accordingly, the term website may be used interchangeably with the terms web page and server. The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "example" is used herein to mean "serving as an example or illustration." Any aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A computer-implemented method for endpoint device-specific stream control for multimedia conferencing, the method comprising:
   providing, using one or more computing devices, a hosted multimedia conference to a plurality of participant devices;
   providing, using the one or more computing devices, video stream controls to each of the plurality of participant devices, wherein for each of the plurality of participant devices, the video stream controls provide for controlling video stream transmissions to the participant device, the video stream transmissions corresponding to a plurality of video streams provided by the plurality of participant devices other than the participant device;
   receiving, using the one or more computing devices, first selections of at least some of the video stream controls from each the plurality of participant devices; and controlling, using the one or more computing devices, for each of the plurality of participant devices, the video stream transmissions of the plurality of video streams provided by the other participant devices to the participant device, based at least in part on the first selections of the at least some of the video stream controls received from the participant device, wherein for each of the plurality of participant devices, the video stream controls include a control for allocating bandwidth for the plurality of video streams provided by the other participant devices, and wherein controlling the video stream transmissions comprises allocating the bandwidth for at least one of the video stream transmissions, in a case where the first selections include selection, via the control for allocating the bandwidth, by at least one of the participant devices.

2. The method of claim 1, wherein controlling the video stream transmissions comprises starting at least one of the video stream transmissions or stopping at least one of the video stream transmissions.

3. The method of claim 1, wherein the controlling the video stream transmissions comprises modifying a video quality associated with at least one of the video stream transmissions.

4. The method of claim 1, further comprising:
determining, using the one or more computing devices, whether each of the plurality of participant devices is capable of providing a video stream.

5. The method of claim 4, wherein the determining whether each of the plurality of participant devices is capable of providing the video stream further comprises receiving, using the one or more computing devices, an indication of whether each of the plurality of participant devices is capable of providing the video stream from each of the plurality of participant devices.

6. The method of claim 4, wherein the video stream controls are provided exclusively for each of the other participant devices that is determined to be capable of providing the video stream.

7. The method of claim 1, further comprising:
providing, using the one or more computing devices, for each of the plurality of participant devices, audio stream controls to the participant device, wherein the audio stream controls provide for controlling audio stream transmissions to the participant device, the audio stream transmissions corresponding to a plurality of audio streams provided by the plurality of participant devices other than the participant device;

receiving, using the one or more computing devices and from each the plurality of participant devices, second selections of at least some of the audio stream controls; and controlling, using the one or more computing devices, for each of the plurality of participant devices, the audio stream transmissions of the plurality of audio streams provided by the other participant devices to the participant device, based at least in part on the second selections of the at least some of the audio stream controls received from the participant device.

8. A computer-implemented method for controlling endpoint-specific streams from an endpoint device in a multimedia conference, the method comprising:
participating, using one or more computing devices, in a multimedia conference with a plurality of participant devices;
receiving, using the one or more computing devices, video stream controls corresponding to the plurality of participant devices in the multimedia conference that are capable of providing video streams;
receiving a selection, using the one or more computing devices, of one or more of the video stream controls; and
receiving, using the one or more computing devices, a plurality of video streams of the plurality of participant devices corresponding exclusively to the one or more selected video stream controls,
wherein the video stream controls include a control for allocating bandwidth for the plurality of video streams provided by the plurality of participant devices, and
wherein, in a case where the selection is associated with the control for allocating bandwidth, the bandwidth is allocated in accordance with the selection.

9. The method of claim 8, further comprising:
deselecting, using one or more computing devices, at least one of the one or more selected video stream controls, wherein the receiving the video stream of the participant device corresponding to the at least one of the one or more selected video stream controls is terminated in response to the deselecting.

10. The method of claim 8, further comprising providing, using the one or more computing devices, an indication of whether the endpoint device is capable of providing a video stream.

11. The method of claim 10, further comprising:
receiving, using the one or more computing devices, a request for the video stream of the endpoint device, when the endpoint device is capable of providing the video stream; and
providing, using the one or more computing devices, the video stream of the endpoint device.

12. The method of claim 8, further comprising:
receiving, using the one or more computing devices, audio stream controls corresponding to the plurality of participant devices in the multimedia conference that are capable of transmitting audio streams;
selecting, using the one or more computing devices, some of the audio stream controls; and
receiving, using the one or more computing devices, a plurality of audio streams of the plurality of participant devices exclusively corresponding to the selected audio stream controls.

13. A system, comprising:
one or more processors; and
a memory including instructions that, when executed by the one or more processors, cause the one or more processors to perform the steps of:
providing a hosted multimedia conference to a plurality of participant devices;
determining whether each of the plurality of participant devices is capable of providing a video stream transmission;
providing, for each of the plurality of participant devices, a plurality of video stream controls to the participant device, wherein the plurality of video stream controls provide for controlling a plurality of video streams of exclusively the plurality of participant devices other than the participant device that are determined to be capable of providing the video stream transmission;
receiving a selection of a first video stream control of the plurality of video stream controls that corresponds to a first participant device of the plurality of participant devices, wherein the selection is received from a second participant device and a third participant device of the plurality of participant devices;

receiving a first video stream of the plurality of video streams from the first participant device of the plurality of participant devices; and providing the first video stream of the first participant device to the second participant device and the third participant device based at least in part on the received selection of the first video stream control by the second participant device and the third participant device, wherein for each of the plurality of participant devices, the video stream controls include a control for allocating bandwidth for the plurality of video streams provided by the other participant devices, and wherein providing the first video stream comprises allocating bandwidth for the first video stream, in a case where the selection of the first video stream control includes selection, via the control for allocating the bandwidth, for the first video stream.

14. The system of claim 13, the steps further comprising:

receiving, from the second participant device, a second selection of the first video stream control corresponding to the first participant device; and terminating, at least in part in response to the receiving the second selection of the first video stream control, the providing the first video stream of the first participant device to the second participant device, while continuing to provide the first video stream of the first participant device to the third participant device.

15. The system of claim 13, wherein the determining whether each of the plurality of participant devices is capable of providing the video stream transmission further comprises receiving an indication of whether each of the plurality of participant devices is capable of providing the video stream transmission.

16. A non-transitory machine readable medium embodying instructions that, when executed by a machine, allow the machine to perform a method for controlling endpoint-specific streams from an endpoint device in a multimedia conference, the method comprising:

providing a hosted multimedia conference to a plurality of participant devices;

determining whether each of the plurality of participant devices is capable of providing a video stream transmission;

providing, for each of the plurality of participant devices, a plurality of video stream controls to the participant device, wherein the plurality of video stream controls provide for controlling a plurality of video streams of exclusively the plurality of participant devices, other than the participant device, that are determined to be capable of providing the video stream transmission;

receiving a deselection of a first video stream control of the plurality of video stream controls that corresponds to a first participant device of the plurality of participant devices, wherein the deselection is received from a second participant device and a third participant device of the plurality of participant devices; and providing, to the second participant device and the third participant device, a plurality of video streams of the other of the plurality of participant devices that are determined to be capable of providing the video stream transmission exclusive of the first video stream of the first participant device based at least in part on the received deselection of the first video stream control by the second participant device and the third participant device, wherein for each of the plurality of participant devices, the video stream controls include a control for allocating bandwidth for the plurality of video streams provided by the other participant devices, and wherein providing the plurality of video streams comprises allocating the bandwidth for at least one of the video streams, in a case where a received selection of at least some of the video stream controls includes selection, via the control for allocating the bandwidth, by at least one of the participant devices.

17. The non-transitory machine readable medium of claim 16, wherein the determining whether each of the plurality of participant devices is capable of providing the video stream transmission further comprises receiving an indication of whether each of the plurality of participant devices is capable of providing the video stream transmission.

18. The non-transitory machine readable medium of claim 16, wherein the method further comprises:

receiving a selection of the first video stream control of the plurality of video stream controls that corresponds to the first participant device of the plurality of participant devices, wherein the selection is received exclusively from the second participant device of the plurality of participant devices; and providing, at least in part in response to the receiving of the selection, the first video stream of the first participant device to the second participant device.

19. The non-transitory machine readable medium of claim 18, wherein the method further comprises:

determining whether each of the plurality of participant devices is capable of providing an audio stream transmission;

providing, to each of the plurality of participant devices, a plurality of audio stream controls that provide for controlling a plurality of audio streams of exclusively the other of the plurality of participant devices that are determined to be capable of providing the audio stream transmission;

receiving a deselection of a first audio stream control of the plurality of audio stream controls that corresponds to the first participant device of the plurality of participant devices, wherein the deselection is received from the second participant device and the third participant device of the plurality of participant devices; and providing, to the second participant device and the third participant device, a plurality of audio streams of the other of the plurality of participant devices that are determined to be capable of providing the audio stream transmission exclusive of the first audio stream of the first participant device based at least in part on the received deselection of the first audio stream control by the second participant device and the third participant device.

* * * * *